(12) United States Patent
Strid

(10) Patent No.: US 11,300,027 B2
(45) Date of Patent: Apr. 12, 2022

(54) MIXER DEVICE, A USE THEREOF AND A METHOD FOR MIXING

(71) Applicant: VOLVO PENTA CORPORATION, Gothenburg (SE)

(72) Inventor: Henrik Strid, Torslanda (SE)

(73) Assignee: VOLVO PENTA CORPORATION, Gothenburg (SE)

( * ) Notice: Subject to any disclaimer, the term of this patent is extended or adjusted under 35 U.S.C. 154(b) by 241 days.

(21) Appl. No.: 16/604,788

(22) PCT Filed: Apr. 20, 2017

(86) PCT No.: PCT/EP2017/059434
§ 371 (c)(1),
(2) Date: Oct. 11, 2019

(87) PCT Pub. No.: WO2018/192663
PCT Pub. Date: Oct. 25, 2018

(65) Prior Publication Data
US 2020/0378290 A1 Dec. 3, 2020

(51) Int. Cl.
*F01N 3/20* (2006.01)
*B01D 53/94* (2006.01)
(Continued)

(52) U.S. Cl.
CPC ....... *F01N 3/2066* (2013.01); *B01D 53/9431* (2013.01); *B01F 3/04049* (2013.01);
(Continued)

(58) Field of Classification Search
CPC .. F01N 3/2066; F01N 3/2892; F01N 2610/02; F01N 2610/1453;
(Continued)

(56) References Cited

U.S. PATENT DOCUMENTS 7,976,788 B2 * 7/2011 Drost ...................... F01N 13/16
422/225
8,578,706 B2 * 11/2013 Perrot ................... F01N 3/2066
60/295
(Continued)

FOREIGN PATENT DOCUMENTS

CN 1187778 A 7/1998
CN 103270266 A 8/2013
(Continued)

*Primary Examiner* — Devon C Kramer
*Assistant Examiner* — Kelsey L Stanek
(74) *Attorney, Agent, or Firm* — Venable LLP; Jeffri A. Kaminski

(57) ABSTRACT

The invention relates to mixer device (52) for mixing and an additive to the exhaust gas flow from a combustion engine. The mixer device has an additive injection means (1) and a conduit (2) with an inlet opening and an outlet opening. The conduit (2) has a widened portion (5) between the inlet opening and the outlet opening. The additive injection means (1) is located in the widened portion (5) for injecting the additive into the widened portion. The widened portion (5) at the location of the additive injection means (1) defines an injection width (W) being the distance from the additive injection means (1) to the opposite part (6) of the conduit (2). The injection width (W) is larger than the maximum width ($W_1$) of the conduit (2) adjacent the inlet opening. According to the invention, the cross sectional area of the conduit (2) at the location of the additive injection means (1) is smaller than 1.2 times the cross sectional area of the conduit (2) adjacent the inlet opening. The invention also relates to a use of the mixer device and to a method for mixing an additive to an exhaust gas from a combustion engine.

19 Claims, 3 Drawing Sheets

(51) Int. Cl.
  *B01F 3/04* (2006.01)
  *B01F 5/04* (2006.01)
  *B01F 5/06* (2006.01)
  *F01N 3/28* (2006.01)

(52) U.S. Cl.
  CPC .......... *B01F 5/0471* (2013.01); *B01F 5/0654* (2013.01); *F01N 3/2892* (2013.01); *B01F 2215/0422* (2013.01); *B01F 2215/0431* (2013.01); *F01N 2610/02* (2013.01); *F01N 2610/1453* (2013.01)

(58) Field of Classification Search
  CPC ............ B01D 53/9431; B01F 3/04049; B01F 5/0471; B01F 5/0654; B01F 2215/0422; B01F 2215/0431
  USPC .......................................... 366/167.1; 60/324
  See application file for complete search history.

(56) References Cited

U.S. PATENT DOCUMENTS

| | | | |
|---|---|---|---|
| 2007/0163241 | A1 | 7/2007 | Meingast et al. |
| 2012/0073272 | A1 | 3/2012 | Vanvolsem et al. |
| 2013/0276437 | A1 | 10/2013 | Iwasaki |
| 2014/0286832 | A1 | 9/2014 | Yi et al. |
| 2017/0321590 | A1* | 11/2017 | Di Perna ............... F01N 3/2066 |
| 2018/0306081 | A1* | 10/2018 | Muller-Haas ......... F01N 3/2066 |
| 2018/0371978 | A1* | 12/2018 | Sampath ............... F01N 3/2066 |
| 2021/0131330 | A1* | 5/2021 | Yashiro ................. F01N 3/2066 |

FOREIGN PATENT DOCUMENTS

| | | |
|---|---|---|
| CN | 103894082 A | 7/2014 |
| CN | 106536882 A | 3/2017 |
| DE | 102008046439 A1 | 3/2010 |
| WO | 2010056793 A1 | 5/2010 |

\* cited by examiner

MIXER DEVICE, A USE THEREOF AND A METHOD FOR MIXING

FIELD OF INVENTION

The present invention in a first aspect relates to a mixer device for mixing and complete or partial vaporization and/or decomposition of an additive to the exhaust gas flow from a combustion engine, which mixer device includes an additive injection means and a conduit having an inlet opening and an outlet opening, which conduit includes a widened portion between the inlet opening and the outlet opening, and which additive injection means is located in the widened portion for injecting the additive into the widened portion, which widened portion at the location of the additive injection means defines an injection width being the distance from the additive injection means to the opposite part of the conduit, which injection width is larger than the maximum width of the conduit adjacent the inlet opening.

In a second aspect the invention relates to a use of the invented mixer device.

In a third aspect the invention relates to a method for mixing and complete or partial vaporization and/or decomposition of an additive to the exhaust flow from a combustion engine, whereby an additive is injected by an additive injection means into a conduit having an inlet opening and an outlet opening, which additive is injected from the additive injection means located in a widened portion between the inlet opening and the outlet opening, which widened portion at the location of the additive injection means defines an injection width being the distance from the additive injection means to the opposite part of the conduit, which injection width is larger than the maximum width of the conduit adjacent the inlet opening.

A mixer device of this kind is used for the after-treatment, in particular $NO_x$ reduction, of the exhaust gases in a reduction device such as a selective catalytic reduction unit (SCR). The additive is a reductant, e.g. a liquid solution containing urea. Representative example of mixer devices for mixing a reductant with the exhaust gases are disclosed e.g. in US 2014286832, DE 102008046439, US 2007163241 and US 2012073272.

US 2014286832 discloses a urea mixing chamber for an SCR system comprising a tube section in the exhaust flow between a combustion engine and an SCR catalyst. A urea injector in the wall of the tube section is arranged to inject urea into the exhaust flow. The wall where the urea injector is arranged comprises a bulge that increases the distance from the injector to the opposite wall of the tube section. The disclosed mixer device thus is of the kind described initially above and to which the present invention relates.

A problem with mixer devices of the described kind is to overcome insufficient mixing and vaporization and/or decomposition of the additive, e.g. urea solution, injected into the exhaust gas stream, which can lead to crystal formation. This problem may be addressed by the increased distance between the injector and the opposite wall. However, an increased cross section of the tube due to increasing said distance slows down the velocity of the exhaust gas, which reduces the mixing.

SUMMARY OF THE INVENTION

The object of the present invention is to improve the mixing of the additive to the exhaust gas in a mixer device of the kind initially described.

This object is according to the first aspect of the invention achieved in that a mixer device as specified in the preamble of claim 1 includes the specific features specified in the characterizing portion of the claim. Thus, the cross sectional area of the conduit at the location of the additive injection means is smaller than 1.2 times the cross sectional area of the conduit adjacent the inlet opening.

The increased injection width, i.e. the distance between the additive injector means and the opposite side of the conduit, in comparison with the width at the conduit inlet width enhances the mixing of the additive in the exhaust gas. Due to limiting the cross sectional area where the additive is injected, the gas flow velocity is maintained the same as at the inlet or only marginally decreased. By thus substantially maintaining the gas flow velocity, the improved mixing due to the increased injection width is secured. By these simple geometrical design measures backflow or interruption of the flow is avoided.

Preferably the injection means is located closer to the inlet opening than to the outlet opening, for obtaining an optimized mixing process.

Preferably the above mentioned maximum of the relative size of the cross sectional area of the conduit at the location of the additive injection means is 1.1 times.

Normally, but not limiting, the conduit is a tube having a basic circular shape, which means that the width at the inlet opening and the outlet opening is the diameter. In case the inlet opening is not circular, the width thereof is to be understood as its maximum width. In the present application the longitudinal direction is the direction from the inlet opening to the outlet opening. The transversal direction is perpendicular to the longitudinal direction.

According to a preferred embodiment of the invented mixer device, the injection width is in the range of 1.1-2.0 times the maximum width of the conduit adjacent the inlet opening.

The advantages of the invention are more important, the larger the relative width is, since the effect of increased mixing thereby is more accentuated. However a too large width is unpractical with regards to space requirements. The specified range represents an adequate balance between these considerations. Optimal is a range of 1.2-1.5 times, e.g. 1.3 times.

According to a further preferred embodiment, the injection width is larger than the maximum width of the conduit adjacent the outlet opening, and the cross sectional area of the conduit at the location of the additive injection means is smaller than 1.2 times the cross sectional area of the conduit adjacent the outlet opening.

These relations to the outlet correspond to the relations to the inlet. When the width and cross sectional area at the injection region satisfy these condition also with regards the outlet, the advantageous effects obtained by the area relation mentioned above will be still more accentuated. The width relation and the area relation, however, need not be absolutely the same with regards to the inlet and outlet, although this in most cases is practical, e.g. when both the inlet and outlet are circular which normally is the case.

According to a further preferred embodiment, the cross sectional area of the conduit at the location of the additive injection means is smaller than the cross sectional area of the conduit adjacent the inlet opening.

Although the beneficial effects of the present invention appear even when the cross sectional area at the location of the additive injection means is marginally larger than the cross sectional area adjacent the inlet opening, they will be still stronger if that area is actually smaller as in this embodiment.

According to a further preferred embodiment, the cross sectional area of the conduit at the location of the additive injection means is smaller than the cross sectional area of the conduit adjacent the outlet opening.

As described above the efficiency is improved when the corresponding relations prevails also with regards to the outlet opening.

According to a further preferred embodiment, the additive injection means is arranged to inject the additive in a direction forming an angle of 75-105° to a straight centre line connecting a centre of the inlet opening to a centre of the outlet opening.

An injection substantially perpendicular to the flow direction normally is advantageous with regards to practical design considerations.

According to a further preferred embodiment, the widened portion is asymmetric and has a first part provided with a bulge with a top, and an opposite part that is aligned with the parts of the conduit that are adjacent the inlet opening and the outlet opening, respectively.

This asymmetrical design is a simple end efficient measure for obtaining the increased injection width. It minimizes any negative effect on the general flow pattern through the mixer device, since a part of its cross sectional profile at the injection region may be aligned with the profiles ahead and after this region. Through the asymmetrical design it is also constructionally easy to obtain the reduced cross sectional area in the injection region, which is the core of the present invention.

According to a further preferred embodiment, the opposite part has circular shape and an extension in the circumferential direction of about 180°.

Since normally the conduit has a general circular-cylindrical shape adjacent the inlet and outlet openings and a semi-circular shape of the parts aligned with the mentioned opposite part, this embodiment is an advantageous adaption to this generally practical shape of the mixer device.

According to a further preferred embodiment, the bulge in the longitudinal direction extends over a major part of the conduit, and in the longitudinal direction has a profile including a first sloping section 11 extending from adjacent the inlet opening to the top of the bulge and a second sloping section 12 extending from the top of the bulge to adjacent the outlet opening. The sloping sections 11, 12 may be straight or curved.

This shape of the bulge is advantageously adapted for maintaining an appropriate flow pattern through the conduit also adjacent the injection region and complies well with the shape of other portions of the mixer device.

According to a further preferred embodiment, the first sloping section has a longitudinal extension that is longer than the longitudinal extension of the second sloping section. Preferably the sloping sections at least partly are circularly curved.

Since a shorter distance between the inlet opening and the injection region than between the injection region and the outlet opening is preferred, the mentioned relation between the lengths of the sloping sections complies properly with such a distance relation and further contributes to an efficient mixing.

According to a further preferred embodiment, the bulge in a cross section through the top of the bulge perpendicular to the direction from the centre of the inlet opening to the centre of the outlet opening has a profile with a concavely curved section at each lateral side of the bulge such as a recess is formed on each side of the bulge.

The concavely curved sections is an efficient design for obtaining the desired reduction of the cross sectional area. Preferably the concavely curved sections at least partly are circularly curved. Preferably the two concavely curved sections are identical in shape and symmetrically located with regards to a longitudinal plane through the additive injection means.

According to a further preferred embodiment, the recesses extend longitudinally over a major portion of the bulge and are continuously shallowing with increasing longitudinal distance from the top of the bulge.

Thereby the transition in the longitudinal direction of the conduit between its different parts will be smooth and adapted for maintaining an appropriate flow pattern.

According to a further preferred embodiment, the conduit is circular adjacent the inlet opening, and each said concavely curved section at least partly is circularly curved with a radius in the range of 0.5-1.5 times the radius of the conduit adjacent the inlet opening.

This range will normally be sufficient for on one hand obtaining the desired area reduction and on the other hand avoiding disturbing abrupt shape changes in the longitudinal direction. Preferably the projection of each concavely curved section in a transversal plane adjacent the inlet opening, that is located inside the periphery adjacent the inlet opening, has a length corresponding to the part of the periphery of the inlet opening that is intersected by this projection.

According to a further preferred embodiment, the conduit is circular adjacent the inlet opening and, a projection of the cross section through the top of the bulge in a transversal plane adjacent the inlet opening defines a cross section reduction area and a cross section increasing area, which cross section reduction area is defined by the sum of the two areas formed between the circumference of the conduit adjacent the inlet opening and the projection of each concavely curved section, and which cross section increasing area is defined as the area between the circumference of the conduit adjacent the inlet opening and the projection in the plane of the profile of the bulge that is located outside the circumference, whereby the cross section reduction area is at least 25% of the cross section increasing area.

The cross sectional area in the region of the additive injection means will be smaller, the larger this relation is. With the specified lower limit of this relation, the desired relative size of that cross sectional area may be efficiently obtained. Preferably the specified lower limit for the relation is 50%, most preferably the lower limit is 100%. Preferably the cross section reduction area is at least 5% of the cross section area at the inlet opening.

According to a further preferred embodiment, a plate is mounted within the conduit adjacent the mentioned opposite side of the conduit and at a short distance therefrom, which short distance is in the range of 5-20% of the maximum width of the conduit adjacent the inlet opening and substantially follows the shape of the opposite side.

The mixing is more efficient if the surface hit by the injection is heated. By providing such a plate, constituting the wall that is hit by the injection jet, with a small clearance to the wall of the mixer device, the plate will be heated by the exhaust gas flow from both sides. The plate will thus be more heated than the external wall of the mixer device such that mixing is enhanced. The plate preferably is of a material with high thermal conductivity such as a metal.

According to a preferred embodiment, the extension of the plate in the circumferential direction is in the range of 45-200°.

The plate need to have sufficient circumferential extension to make sure that the injection jet will hit the plate, which is attained by the lover range limit. For practical reasons, the plate should not extend more than about half the circumferential or just above that, which is restricted by the upper range limit. Above that limit, the plate would negatively affect the possibility to attain an effective area reduction in the region of the additive injection.

According to a further preferred embodiment, the plate has a thickness that is smaller than the thickness of the wall of the conduit.

Having the plate relatively thin contributes to transfer the heat from the exhaust gas flowing through the clearance between the plate and the adjacent part of the conduit to the surface of the plate that is hit by the injection jet.

According to a further preferred embodiment, the distance from the additive injection means to the part of the plate that is opposite the additive injection means is larger than the maximum width of the conduit adjacent the inlet opening.

With reference to what initially described about the mixing advantages with a long injection width, it is beneficial to have a corresponding large distance to the plate, when such is present. Preferably this distance is in the range of 1.1-2.0 of the width adjacent the inlet opening.

According to a further preferred embodiment, the plate longitudinally extends out through the outlet opening.

Thereby a smooth surface is obtained after the additive injection and thereby is prevented that non-vaporized additive, such as urea gets stuck on any sharp edges that might be present at a flange connection or a weld edge between the conduit and the after-treatment device, e.g. an SCR muffler.

The invention also relates to a combustion engine system including a mixer device according to the present invention, in particular to any of the preferred embodiments thereof.

The combustion engine system may include an internal combustion engine, such as an Otto engine or a diesel engine connected to the inlet opening of the conduit and an after-treatment device, such as an SCR muffler.

The invention further relates to a vehicle, a vessel or a stationary plant including a combustion system according to the present invention.

According to the second aspect of the invention, the object is achieved by a use of the mixer device according to the present invention, in particular to any of the preferred embodiments thereof whereby the additive is a liquid containing urea and the gas/liquid-mixture is used for selective catalytic reduction.

The advantages of the invented mixer device are of particular interest in that kind of context.

According to the third aspect of the invention, the object is achieved in that a method of the kind specified in the preamble of claim 23 includes the specific measure specified in the characterizing portion of the claim. Thus, the additive is injected at a location where the cross sectional area of the widened conduit is smaller than 1.1 times the cross sectional area adjacent the inlet opening.

According to preferred embodiments, the method is performed with the use of a mixer device according to the present invention, in particular according to any of the preferred embodiments, and thereby includes the measures that are implied by the respective features of these embodiments.

The invented use and the invented method and the preferred embodiments thereof, respectively, have advantages similar to those of the invented mixer box and the preferred embodiments thereof, which advantages have been described above.

The above specified preferred embodiments of the invention are set out in the dependent claims. It is to be understood that further preferred embodiments may be constituted by any possible combination of features in the preferred embodiments and with any possible combination of these with features described in the description of examples below.

DESCRIPTION OF EXAMPLES

Figure 1:
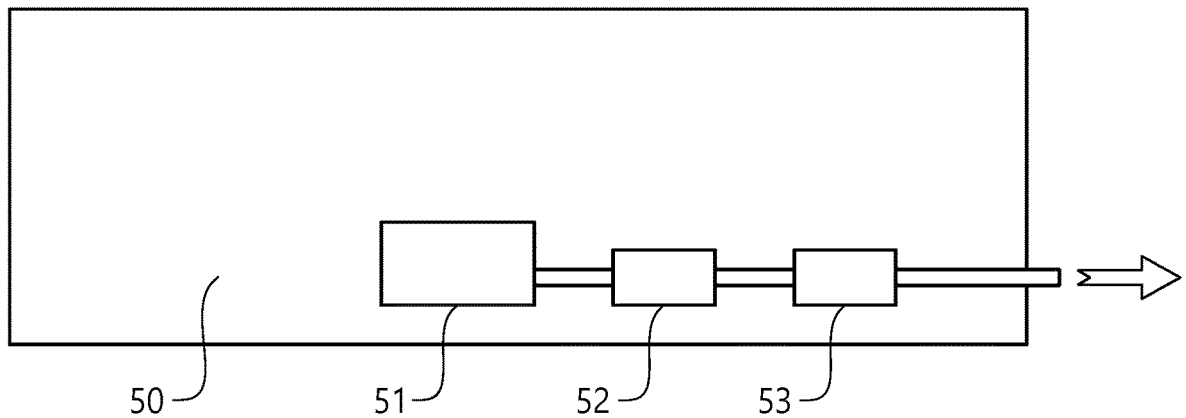
FIG. 1 is a schematic side view of a combustion engine system according to an aspect of the invention and of an apparatus, of which the engine system is a part.

FIG. 1 illustrates the context in which the mixer device 52 according to the invention is intended to be used. Reference numeral 50 represents an apparatus having a combustion engine 51. The apparatus 50 may be a vehicle, vessel or a stationary plant. Exhaust gas from the combustion engine 51 is led to a mixer device 52 for injecting a liquid and mixing the injected liquid with the exhaust gas. From the mixer device the gas is led to a treatment unit 53, e.g. for SCR.

Figure 2:
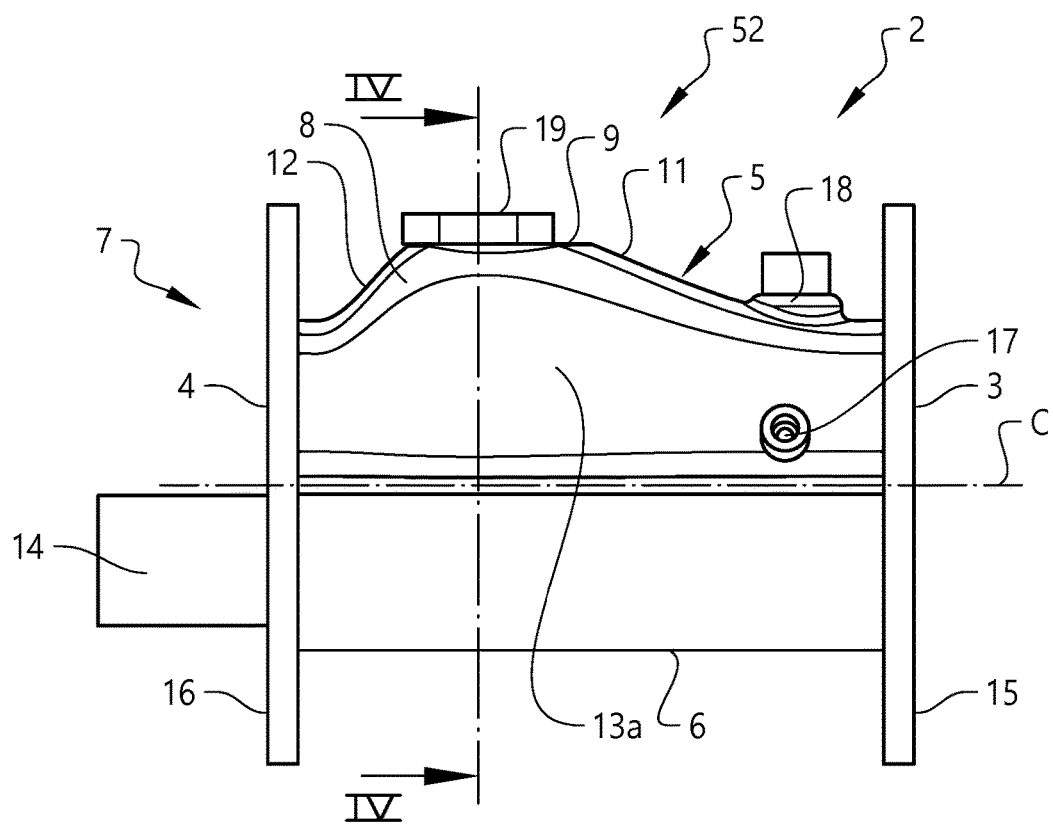
FIG. 2 is a side view of a mixer device according to the invention.

FIG. 2 in a side view depicts a mixer device according to the present invention. The mixer device has a conduit 2 extending from an inlet opening 3 to an outlet opening 4. The inlet opening 3 and the outlet opening 4 are circular and the conduit 2 is circular-cylindrical a short distance adjacent these openings. The inlet opening 3 is provided with a flange 15 for connection to the outlet of an internal combustion engine, and the outlet opening 4 is provided with a similar flange 16 for connection to the inlet of an SCR muffler. The conduit 2 defines an axis C-C from the centre C of the inlet opening 3 to the centre of the outlet opening.

Below the axis C-C the conduit has a circular cross sectional profile, which in the present application is expressed as the opposite part 6. Above the axis, the conduit 2 has a more complex shape. It has a widened portion 5 extending almost along the entire conduit 2. The widened portion 5 has a maximum width at a distance from the inlet opening 3 that is about ⅔ of the length of the conduit 2. The maximum width extends a short longitudinal distance.

At the middle of the maximum width, additive injection means 1 (not visible in this figure, see FIG. 4) is, mounted inside the cover 19. The injected additive may be a liquid containing urea.

From the right end of the maximum width the widened portion 5 slopes down to the short cylindrical conduit portion adjacent the inlet opening 3. On the left side there is a corresponding slope towards the short cylindrical conduit portion adjacent the outlet opening 4. The latter slope is shorter and steeper than the other one. The widened portion 5 thus forms a bulge 8 with a top 9 in the region adjacent the additive injection means. The distance from the top 9 of the bulge 8 to the opposite part 6 in the illustrated example is about 1.5 times the radius of the inlet opening 3.

On each lateral sides of the bulge 8 there is a recess. In a plane perpendicular to the axis C-C in the region where the additive injection means is located, each recess is formed by a concavely curved section of the profile 13a, 13b of the conduit wall. Each recess extends over a major portion of the bulge 8 and becomes continuously shallower in the direction to the inlet opening 3 and to the outlet opening 4.

Inside the conduit there is mounted a plate 14 of metal, which extend along the entire conduit 2 and projects a short distance out from the outlet opening 4. The plate is substantially semi-circular and is located adjacent the circularly shaped portion below the axis C-C, i.e. the opposite side 6, with a small clearance d therebetween.

Conventionally the mixer device 52 may be provided with sensors 17, 18 adjacent the inlet opening 3 for sensing the temperature and $NO_R$-content, respectively.

Figure 3:
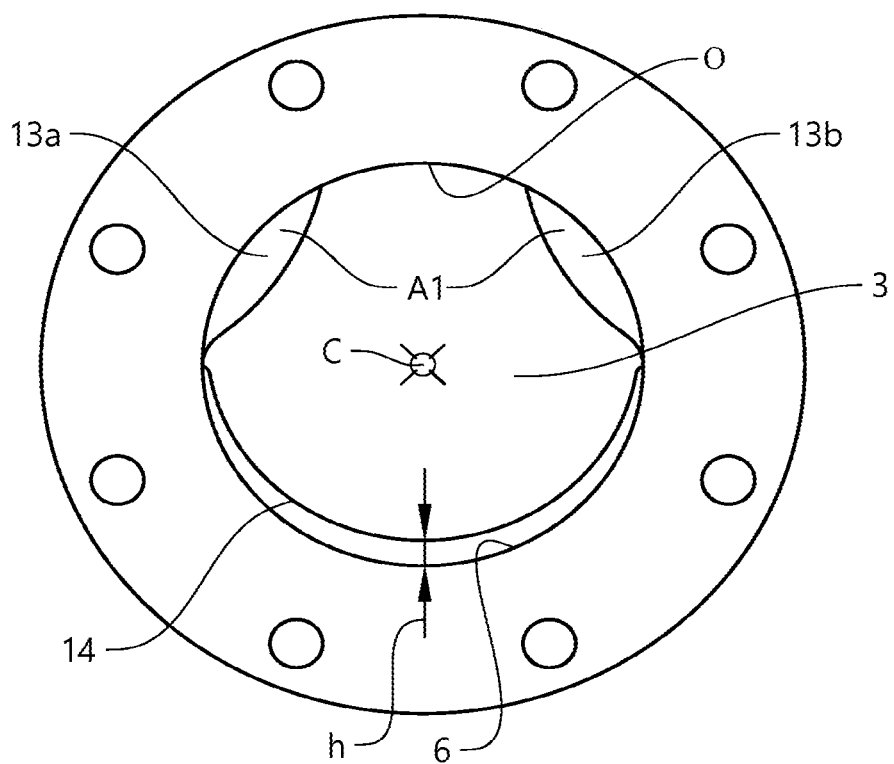
FIG. 3 is an end view from the inlet end of the mixer device illustrated in FIG. 2.

In the cross section in FIG. 3, the arrangement of this plate 14 can be seen. The distance h between the plate 14 and the conduit wall is small. Where the distance as largest it is about 10% of the radius of the inlet opening. The distance d decreases continually in the lateral directions from its maximum. The plate 14 is relatively thin with decreasing thickness in the lateral directions. The maximum thickness of the plate is less than the wall thickness of the conduit 2.

In FIG. 3 the profiles 13a, 13b also are visible. The profiles 13a, 13b in this cross section are circular curves having a radius about equal the radius of the inlet opening 3. When the circumference O of the inlet opening 3 and the concavely curved section 13a are projected in one and the same plane perpendicular to the axis C-C, they together enclose a sector-lake area. A corresponding area is formed between the circumference O and the concavely curved section 13b on the laterally other side. These two areas together define an area reduction in comparison with the area of the inlet opening 3. The sum of these two areas thereby represents a cross section reduction area $A_1$.

Figure 4:
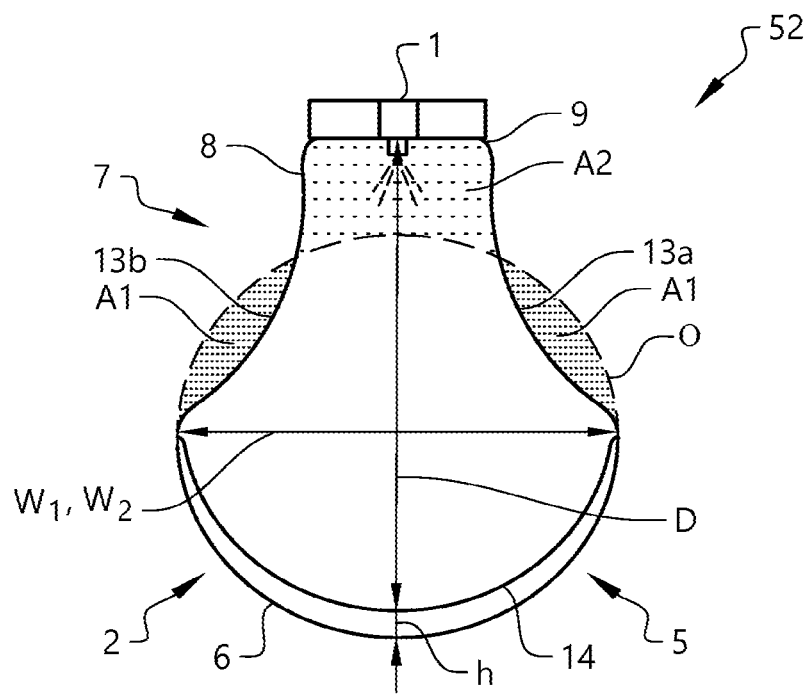
FIG. 4 is a schematic section along line IV-IV of FIG. 2.

FIG. 4 is a cross section through the conduit 2 of the mixer device 52 depicted in FIG. 2 at the region of the additive injection means 1, where the widening portion is as widest. The first, upper part 7 of the profile is formed by the bulge 8 at the top region, from which the concavely curved sections 13a, 13b extend down to the opposite part 6, which is circular and extends about 180°. With a broken line, the circumference of the inlet opening O is indicated, which circumferential at the lower half of the figure aligns with the opposite part 5.

The injected liquid containing urea is injected downwards and hits the plate 14. The distance between the additive injection means 1 and the plate 14 is indicated with D. The diameter of the inlet opening is $W_1$, which in the example is equal to the diameter $W_2$ of the outlet opening. The distance D in the example is about 1.25 times the diameter $W_1$, $W_2$. The cross sectional increasing area $A_2$ is the cross sectional area of the bulge 8 above the circumferential O of the inlet opening. This area and the cross sectional reduction area $A_1$ as defined above are indicated as shaded in the figure.

Figure 5:
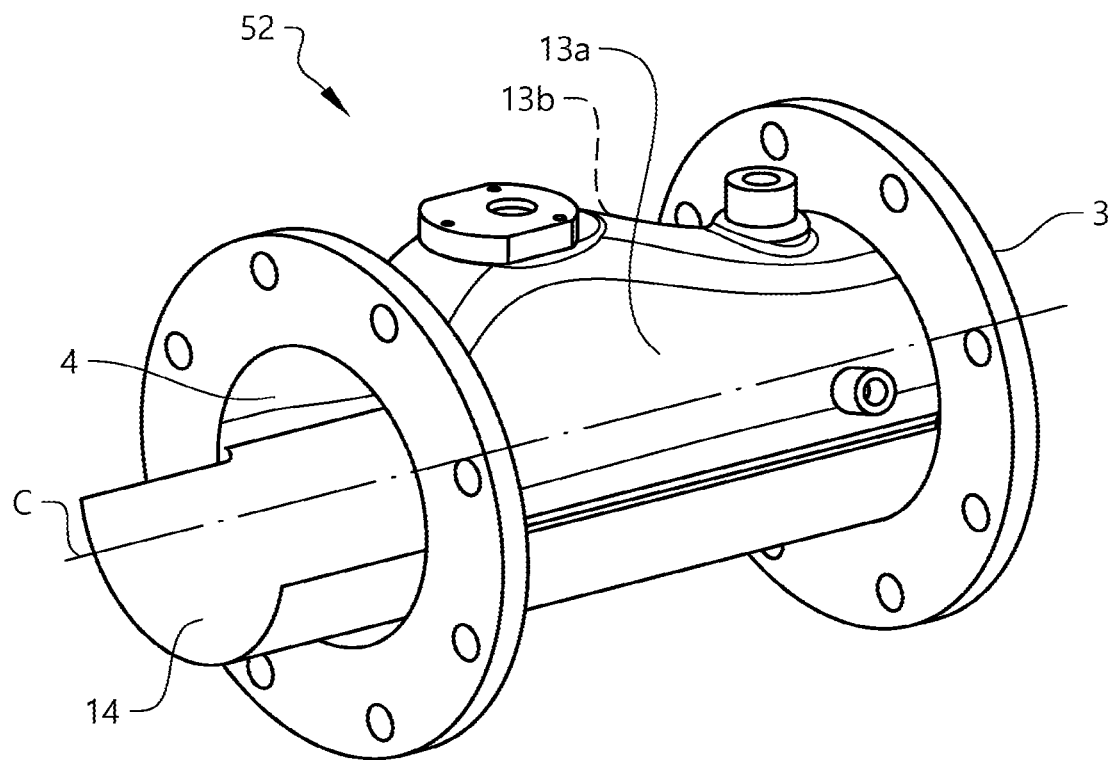
FIG. 5 is a perspective view of the mixer device illustrated in FIG. 2.

In the perspective view of FIG. 5, the shape of the recessions formed by the concavely curved sections 13a, 13b can be seen.

Figure 6:
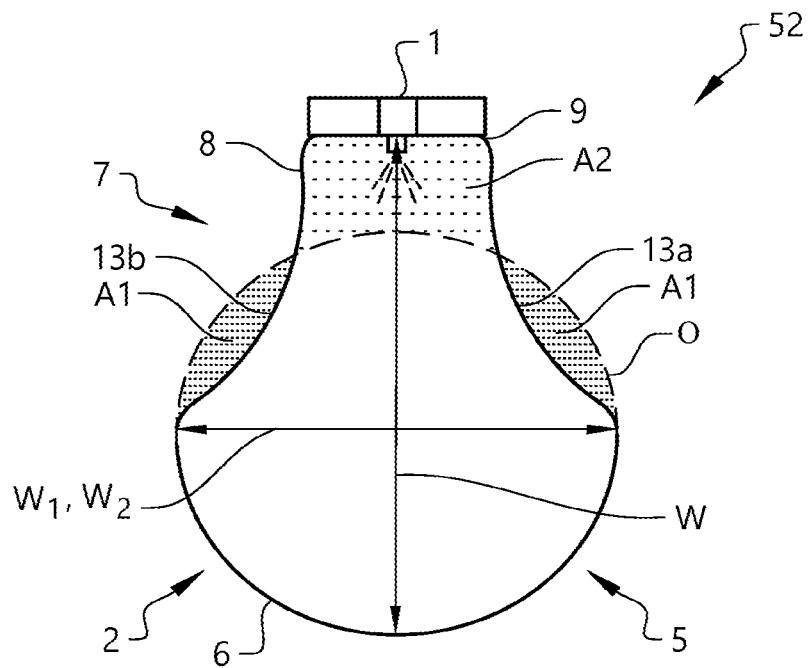
FIG. 6 is a section similar to that of FIG. 4, but illustrates a second example

FIG. 6 illustrates a second example of the invention. In this example the conduit 2 does not have a plate adjacent the opposite part 6 corresponding to plate 14 in FIG. Instead the injection jet hits the opposite part 6 of the conduit 2 with the injection width W, being the distance from the additive injection means 1 to the opposite part 6. In all other respects the example of FIG. 6 is similar to that of FIG. 4.

The invention claimed is:

1. A mixer device for an additive to an exhaust gas flow from a combustion engine, the mixer device includes an additive injection means and a conduit having an inlet opening and an outlet opening, the conduit includes a widened portion between the inlet opening and the outlet opening, and the additive injection means is located in the widened portion for injecting the additive into the widened portion, the widened portion at the location of the additive injection means defines an injection width being the distance from the additive injection means to an opposite part of the conduit, the injection width is larger than a maximum width of the conduit adjacent the inlet opening, a cross sectional area of the conduit at the location of the additive injection means is smaller than 1.2 times a cross sectional area of the conduit adjacent the inlet opening, wherein the widened portion is asymmetric with respect to a horizontal plane parallel to or containing a longitudinal axis of the conduit and has a first part provided with a bulge with a top, and the opposite part that is aligned with parts of the conduit that are adjacent the inlet opening and the outlet opening, respectively, wherein the bulge in a cross section through the top of the bulge perpendicular to a direction from a center of the inlet opening to a center of the outlet opening has a profile with a concavely curved section at each lateral side of the bulge characterized in that the conduit is circular adjacent the inlet opening and wherein a projection of said cross section through the top of the bulge in a transversal plane adjacent the inlet opening defines a cross section reduction area and a cross section increasing area, the cross section reduction area is defined by the sum of two areas formed between a circumference of the conduit adjacent the inlet opening and a projection of each said concavely curved section, and the cross section increasing area is defined as the area between the circumference of the conduit adjacent the inlet opening and the projection of said concavely curved section that is in said plane of the profile of the bulge that is located outside said circumference, and wherein the cross section reduction area is at least 25% of the cross section increasing area.

2. The mixer device according to claim 1, wherein the injection width is in a range of 1.1-2.0 times said maximum width of the conduit adjacent the inlet opening.

3. The mixer device according to claim 1, wherein the injection width is larger than the maximum width of the conduit adjacent the outlet opening, and the cross sectional area of the conduit at the location of the additive injection means is smaller than 1.2 times the cross sectional area of the conduit adjacent the outlet opening.

4. The mixer device according to claim 1, wherein the cross sectional area of the conduit at the location of the additive injection means is smaller than the cross sectional area of the conduit adjacent the inlet opening.

5. The mixer device according to claim 1, wherein the cross sectional area of the conduit at the location of the additive injection means is smaller than the cross sectional area of the conduit adjacent the outlet opening.

6. The mixer device according to claim 1, wherein the additive injection means is arranged to inject the additive in a direction forming an angle of 75-105° to a straight center line connecting a center of the inlet opening to a center of the outlet opening.

7. The mixer device according to claim 6, wherein said opposite part has circular shape and an extension in the circumferential direction of 180°.

8. The mixer device according to claim 6, wherein the bulge in the longitudinal direction extends over a major part of the conduit and in the longitudinal direction has a profile including a first sloping section extending from adjacent the inlet opening to the top of the bulge and a second sloping section extending from the top of the bulge to adjacent the outlet opening.

9. The mixer device according to claim 8, wherein the first sloping section has a longitudinal extension that is longer than a longitudinal extension of the second sloping section.

10. The mixer device according to claim 9, wherein the recesses extend longitudinally over a major portion of the bulge and are continuously shallowing with increasing longitudinal distance from the top of the bulge.

11. The mixer device according to claim 9, wherein the conduit is circular adjacent the inlet opening and wherein each said concavely curved section at least partly is circularly curved with a radius in a range of 0.5-1.5 times the radius of the conduit adjacent the inlet opening.

12. The mixer device according to claim 1, wherein a plate is mounted within the conduit adjacent said opposite part of the conduit and at a short distance therefrom, which short distance is in a range of 5-20% of the maximum width of the conduit adjacent the inlet opening and a follows the shape of said opposite part.

13. The mixer device according to claim 12, wherein the extension of the plate in the circumferential direction is in a range of 45-200°.

14. The mixer device according to claim 12, wherein the plate has a thickness that is smaller than the thickness of the wall of the conduit.

15. The mixer device according to claim 12, wherein the distance from the additive injection means to the part of the plate that is opposite the additive injection means is larger than the maximum width of the conduit adjacent the inlet opening.

16. The mixer device according to claim 12, wherein the plate longitudinally extends out through the outlet opening.

17. A combustion engine system including the mixer device according to claim 1.

18. A vehicle, a vessel or a stationary plant including the combustion system according to claim 17.

19. A use of the mixer device according to claim 1, wherein said additive is a liquid containing urea and wherein the gas/liquid-mixture is used for selective catalytic reduction.

* * * * *